Patented Dec. 2, 1952

2,620,367

UNITED STATES PATENT OFFICE 2,620,367

LEAD-ACID ACCUMULATOR

Harold George Brown, Bakewell, England, assignor to The Chloride Electrical Storage Company Limited, Clifford Junction, England, a British company No Drawing. Application March 17, 1950, Serial No. 150,343. In Great Britain December 4, 1947

3 Claims. (Cl. 136—65)

In the manufacture of lead-acid accumulators of the pasted or Faure type the plates usually consist of grids having intersecting ribs, often of small cross sectional area, into which the active materials are pressed or pasted. These grids are cast in lead, but to stiffen and strengthen them, the lead is alloyed with small percentages of other metals such as antimony, tin, and cadmium. The presence, however, of metals other than lead in the accumulator may produce local action with consequent loss of charge when standing on open circuit, accompanied by excessive evolution of hydrogen, both on open circuit and during discharge, the excessive evolution of hydrogen being for certain kinds of service much more objectionable than the loss of charge, as hydrogen gas is explosive.

Of the metals used for the purpose of hardening and stiffening the grids of lead-acid accumulators of the pasted type, antimony is one of the most likely to produce local action in the accumulator as it becomes gradually released by anodic corrosion of the grids. At the same time, it has hitherto been found impossible in practice to dispense with antimony, because its absence leads to other difficulties, such as greater susceptibility to anodic corrosion, lack of tensile strength and hardness and general unsoundness.

The object of the present invention is to provide an improved alloy for lead-acid accumulator plates of the pasted type which whilst giving the requisite hardness, tensile strength and durability obviates the defects associated with the use of antimony in such plates, namely loss of charge and evolution of hydrogen due to local action in the negative plates.

In accordance with my invention, pasted plates of lead-acid accumulators are made of an alloy containing lead, tin and selenium. The proportions of selenium lie within the range of 0.05% and 0.1%, and the proportions of tin within the range of 4.75% and 5.75%. Thus, in a typical case the lead may constitute 94.925%, tin 5% and selenium 0.075%.

The invention further comprises alloying the selenium with the tin and then alloying the resultant metal with the lead. By this method, I find that loss of the lower melting point metals due to volatilisation can be avoided or minimised.

Accumulators comprising positive plate grids made from the improved alloy possess superior characteristics in respect of local action and loss of charge, and unlike accumulators having antimonial lead positive grids, do not deteriorate in this respect with age.

What I claim is:

1. The method of producing a pasted plate lead acid accumulator having a reduced loss of charge in open circuit and reduced evolution of hydrogen, comprising constructing the plates thereof from an alloy consisting of lead containing tin in proportion of about 4.75 to 5.75% and selenium in proportion of about .05 to 0.1%, the balance being antimony and tellurium-free lead containing usual impurities, said alloy being formed by first alloying the selenium with the tin and then alloying the product thereof with the lead.

2. A pasted plate lead acid accumulator having reduced charge loss in open circuit and having reduced hydrogen evolution, the plates thereof being formed of an alloy consisting of lead containing tin in proportion of about 4.75 to 5.75% and selenium in proportion of about .05 to 0.1%, the balance being antimony and tellurium-free lead containing usual impurities.

3. The lead acid accumulator as defined in claim 2, wherein the plate alloy contains 94.925% lead, 5% tin and .075% selenium.

HAROLD GEORGE BROWN.

REFERENCES CITED

The following references are of record in the file of this patent:

UNITED STATES PATENTS

| Number | Name | Date |
|---|---|---|
| 1,021,997 | Morrison | Apr. 2, 1912 |
| 1,939,799 | Wallis et al. | Dec. 19, 1933 |

FOREIGN PATENTS

| Number | Country | Date |
|---|---|---|
| 411,524 | Great Britain | June 8, 1934 |
| 414,606 | Great Britain | Aug. 9, 1934 |
| 505,438 | Great Britain | May 8, 1939 |